US010817571B2

(12) United States Patent
McCaffrey

(10) Patent No.: US 10,817,571 B2
(45) Date of Patent: Oct. 27, 2020

(54) TECHNIQUES FOR RETRIEVING ELECTRONIC PATENT DOCUMENTS

(71) Applicant: Accio Patent LLC, Bethesda, MD (US)

(72) Inventor: Corey Stanley Gordon McCaffrey, Bethesda, MD (US)

(73) Assignee: Accio Patent LLC, Bethesda, MD (US)

( * ) Notice: Subject to any disclaimer, the term of this patent is extended or adjusted under 35 U.S.C. 154(b) by 217 days.

(21) Appl. No.: 16/033,208

(22) Filed: Jul. 12, 2018

(65) Prior Publication Data

US 2019/0018845 A1 Jan. 17, 2019

Related U.S. Application Data

(60) Provisional application No. 62/532,290, filed on Jul. 13, 2017.

(51) Int. Cl.
| | |
|---|---|
| *G06F 16/93* | (2019.01) |
| *G06K 19/06* | (2006.01) |
| *G06F 16/338* | (2019.01) |
| *G06F 16/955* | (2019.01) |

(52) U.S. Cl.
CPC ............ *G06F 16/93* (2019.01); *G06F 16/338* (2019.01); *G06F 16/9554* (2019.01); *G06K 19/06037* (2013.01); *G06F 2216/11* (2013.01)

(58) Field of Classification Search
CPC .... G06F 21/552; G06F 19/3456; G06F 19/00; G06F 16/9554; G06F 21/60; G06F 21/602; G06F 21/6227; G06F 2221/2137; G06F 19/3462
USPC .......................................... 707/600–831, 899
See application file for complete search history.

(56) References Cited

U.S. PATENT DOCUMENTS

| | | | | |
|---|---|---|---|---|
| 7,194,691 B1* | 3/2007 | Zilka | ..................... | G06F 16/955 715/739 |
| 9,075,779 B2* | 7/2015 | King | .................. | H04N 1/00854 |
| 2005/0149343 A1* | 7/2005 | Rhoads | .................. | G06Q 10/10 705/311 |
| 2013/0191294 A1* | 7/2013 | Lee | ......................... | G06Q 10/06 705/310 |
| 2013/0275849 A1* | 10/2013 | King | .................. | H04N 1/00875 715/229 |
| 2020/0110792 A1* | 4/2020 | Tsabba | .................. | G06F 3/0486 |

\* cited by examiner

*Primary Examiner* — Angelica Ruiz

(57) ABSTRACT

Techniques for retrieving electronic patent documents are disclosed. In one particular embodiment, the techniques may be realized as a method comprising receiving, by at least one computer processor communicatively coupled to a mobile device, an image containing an encoding of a patent number; decoding, by the at least one computer processor, the patent number; transmitting, by the at least one computer processor, the patent number to a patent database; and receiving, by the at least one computer processor, patent information based on the patent number.

20 Claims, 16 Drawing Sheets

Patent Fetcher Device
600B

Patent Fetcher Device
700

710

US 9,311,626 B2

Title: ELECTRONIC MAIL REPLY WITH UPDATE

Inventors:
MCCAFFREY et al.

Original Assignee:
IBM [US]

Priority Date:     Aug 7, 2008
Filing Date:       Aug 7, 2008
Publication Date:  Apr 12, 2016

Abstract:
When a user reading a received e-mail message selects a reply with revisions option, a user interface object is generated that allows the user to directly revise the contents of the received e-mail message, and to provide a reason for the revision. The resulting reply message is a revision of the original message, and is transmitted to original sender and all other recipients of the original message, with indications of how and by whom the original message was revised. When multiple revisions of a message are received, the multiple revisions are automatically merged into a single user interface object such that all the revisions can be read simultaneously by the receiving

Done

FIG. 7

TECHNIQUES FOR RETRIEVING ELECTRONIC PATENT DOCUMENTS

CROSS-REFERENCE TO RELATED APPLICATIONS

This patent application claims priority to U.S. Provisional Patent Application No. 62/532,290, filed Jul. 13, 2017, which is hereby incorporated by reference in its entirety as if fully set forth herein.

FIELD OF THE DISCLOSURE

This disclosure generally relates to electronic patent documents, and, more particularly, to techniques for retrieving electronic patent documents.

BACKGROUND OF THE DISCLOSURE

A typical electronic patent document system stores copies of patents in a database for later retrieval. The database may also store searchable metadata about the stored copies of patents such as the patent number, application or serial number, the title, and the inventor or list of co-inventors. The database may provide a user interface or an application programming interface (API) for retrieving the stored copies of patents. For example, the database may offer a search bar for users to query the database and make a selection.

Although typical electronic patent document systems may be effective at retrieving stored copies of patents in some instances, in other instances they may have no substantial impact on retrieval. Typically, instances under which typical electronic patent document systems may be ineffective are those that arise when the user already knows the number of the electronic patent document to retrieve, or when the user has a printed copy of all or part of the patent that includes a bar code or another type of encoded identifier.

In view of the foregoing, it may be understood that there may be a need for a system that enables faster and simpler retrieval of electronic patent documents from an electronic patent document system when, for example, the user knows the patent number or has a printed copy of the patent.

SUMMARY OF THE DISCLOSURE

Techniques for retrieving electronic patent documents are disclosed. In one particular embodiment, the techniques may be realized as a method comprising receiving, by at least one computer processor communicatively coupled to a mobile device, an image containing an encoding of a patent number; decoding, by the at least one computer processor, the patent number; transmitting, by the at least one computer processor, the patent number to a patent database; and receiving, by the at least one computer processor, patent information based on the patent number.

In accordance with other aspects of this particular embodiment, the encoding may be a bar code.

In accordance with other aspects of this particular embodiment, the encoding may be a QR code.

In accordance with other aspects of this particular embodiment, the patent number may be a patent application publication number.

In accordance with other aspects of this particular embodiment, the patent number may include a country code.

In accordance with other aspects of this particular embodiment, the patent number may include a kind code.

In accordance with other aspects of this particular embodiment, the image may include an encoding of a URL associated with the patent number.

In accordance with other aspects of this particular embodiment, transmitting the patent number to the patent database may further comprise generating, by the at least one computer processor, a call to an API of the patent database.

In accordance with other aspects of this particular embodiment, an issuing authority of a patent associated with the patent number may be different from a provider of the patent database.

In accordance with other aspects of this particular embodiment, the patent information may include a title of a patent associated with the patent number and at least one inventor of the patent.

In accordance with other aspects of this particular embodiment, the patent information may include an electronic copy of a patent associated with the patent number.

In accordance with other aspects of this particular embodiment, the electronic copy may be a PDF file.

In accordance with other aspects of this particular embodiment, decoding the patent number may further comprise determining, by the at least one computer processor, a presence of the encoding in the image; and determining, by the at least one computer processor, a type of encoding in the image.

In accordance with other aspects of this particular embodiment, the method may further comprise displaying the patent information on a screen of the mobile device.

In accordance with other aspects of this particular embodiment, the method may further comprise transmitting, by the at least one computer processor, the patent information to a storage device different from the patent database.

In accordance with other aspects of this particular embodiment, the mobile device may be a smartphone with a touchscreen.

In another particular embodiment, the techniques may be realized as a method comprising receiving, by at least one computer processor communicatively coupled to a mobile device, a user-inputted patent number; converting, by the at least one computer processor, the patent number into a patent database request; transmitting, by the at least one computer processor, the patent database request to the patent database; and receiving, by the at least one computer processor, patent information associated with the patent number from the patent database.

In accordance with other aspects of this particular embodiment, the user-inputted patent number may include a default country code or a user-selected country code.

In accordance with other aspects of this particular embodiment, the patent database request may include one of: an empty kind code parameter, a default kind code parameter, or a user-inputted code parameter.

In accordance with other aspects of this particular embodiment, the user-inputted patent number may include a default patent type or a user-selected patent type.

In accordance with other aspects of this particular embodiment, the user-selected patent type may be one of: a utility patent, a reissue patent, or a design patent.

In another particular embodiment, the techniques may be realized as a system comprising at least one computer processor communicatively coupled to a mobile device, wherein the at least one computer processor is configured to perform the steps in any of the above-discussed methods.

In another particular embodiment, the techniques may be realized as an article of manufacture comprising a non-transitory processor readable medium and instructions stored on the medium, wherein the instructions are configured to be readable from the medium by at least one computer processor communicatively coupled to a mobile device and thereby cause the at least one computer processor to operate to perform the steps in any of the above-discussed methods.

In another particular embodiment, the techniques may be realized as an article of manufacture comprising an image capture device for receiving images or video; at least one computer processor communicatively coupled to the image capture device for automatically detecting an encoding of a patent number in at least one of the images or in at least one frame of the video; a network communication device for transmitting the patent number to a patent database and receiving patent information from the database; a screen for displaying the patent information; and a memory for storing the patent information.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

FIG. 7 shows a schematic representation of a patent fetcher device according to embodiments of the present disclosure.

DETAILED DESCRIPTION

A typical electronic patent document system stores copies of patents in a database for later retrieval. The database may also store searchable metadata about the stored copies of patents such as the patent number, application or serial number, the title, and the inventor or list of co-inventors. The database may provide a user interface or an application programming interface (API) for retrieving the stored copies of patents. For example, the database may offer a search bar for users to query the database and make a selection.

Although typical electronic patent document systems may be effective at retrieving stored copies of patents in some instances, in other instances they may have no substantial impact on retrieval. Typically, instances under which typical electronic patent document systems may be ineffective are those that arise when the user already knows the number of the electronic patent document to retrieve, or when the user has a printed copy of all or part of the patent that includes a bar code or another type of encoded identifier.

In view of the foregoing, it may be understood that there may be a need for a system that enables faster and simpler retrieval of electronic patent documents from an electronic patent document system when, for example, the user has the patent number or a printed copy of the patent.

Figure 1:
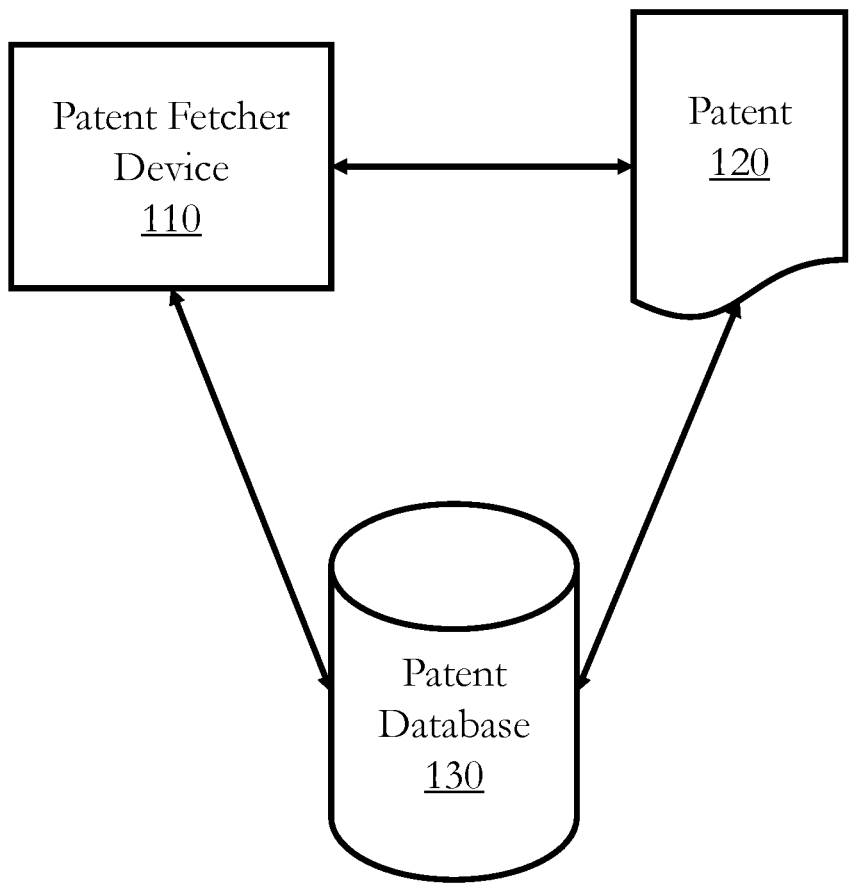
FIG. 1 shows a block diagram of a patent fetcher system according to embodiments of the present disclosure.

FIG. 1 shows a block diagram of a patent fetcher system 100 according to embodiments of the present disclosure. The description herein describes network elements, computers, and/or components of a system and method for retrieving electronic patent documents that may include one or more modules. As used herein, the term "module" may be understood to refer to computing software, firmware, hardware, and/or various combinations thereof. Modules, however, are not to be interpreted as software that is not implemented on hardware, firmware, or recorded on a non-transitory processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the patent fetcher system 100 may include a patent fetcher device 110, one or more patents such as patent 120, and one or more patent databases such as patent database 130.

In some embodiments, the patent fetcher device 110 may be a mobile computer processing device such as a smartphone, tablet, smart watch, laptop, e-reader, etc. In other embodiments, the patent fetcher device 110 may be a handheld peripheral (e.g., handheld bar code scanner or keypad).

In some embodiments, the patent fetcher device 110 may be used for scanning or otherwise interpreting information about a patent such as patent 120. For example, patent 120 may have a patent number or other serial number, which may be scanned or otherwise inputted into the patent fetcher device. Patent 120 may include some encoded information, such as the patent/serial number, encoded in a bar code, data matrix, QR code, or other type of machine- or processor-readable code or image. For example, the United States Patent and Trademark Office (USPTO) includes bar codes on both issued patents and application publications, and the State Intellectual Property Office of the People's Republic of China (SIPO) includes 2-D data matrix or QR codes on both issued patents and application publications.

It may be understood that, for purposes of the present disclosure, "patent" may be shorthand to include patent related documents, included granted/issued patents, published patent applications, patent office correspondence (e.g., image file wrapper or file history documents), etc. Specifically, patent 120, for example, may be an application publication of a pending patent application or an issued patent. Patent 120 may be, for example, a utility patent, design patent, reissue patent, plant patent, etc.

In other embodiments, a similarly featured "trademark fetcher system" (not shown) may be used to retrieve trademark-related electronic documents from trademark databases.

The patent fetcher device 110 may be in communication with patent database 130. For example, the patent fetcher device 110 may transmit a query to the patent database 130 (e.g., via an API call over a telecommunications network). The patent fetcher device 110 may receive information from the patent database 130, such as search results, patent metadata (e.g., title, inventor data, applicant data, assignee data, abstract, claims, drawings, description, etc.), or copies of electronic patent documents (e.g., in PDF, TIFF, or other document or image formats). Patent database 130 may be a public or government-provided database such as a USPTO database, European Patent Organisation (EPO) database, World Intellectual Property Organization (WIPO), etc. In some embodiments, patent database 130 may be a private, third-party, or otherwise non-governmental database.

In some embodiments, the patent fetcher device 110 may include an image capture device such as a camera, which may be used to scan or otherwise detect a bar code on a copy of patent 120 (e.g., a printed paper copy or an electronic copy displayed on a screen). The patent fetcher device 110 may decode the bar code to generate or construct a query or API call to patent database 130. In response to the query or API call, the patent fetcher device 110 may receive information about patent 120 or an electronic copy of patent 120 for storage and/or display to the user. In some embodiments, the patent fetcher device 120 may transmit the electronic copy of the patent 120 or other information about patent 120 to third-party storage (e.g., Apple iCloud, Dropbox, Box, etc.).

In some embodiments, one or more third-party mobile backend-as-a-service (BaaS) or other server or cloud service (not shown) may serve as an intermediary between a patent fetcher device 110 and a patent database 130 for functions such as business logic, storage, authentication, encryption/key management, digital rights management, usage tracking, etc.

Figure 2:
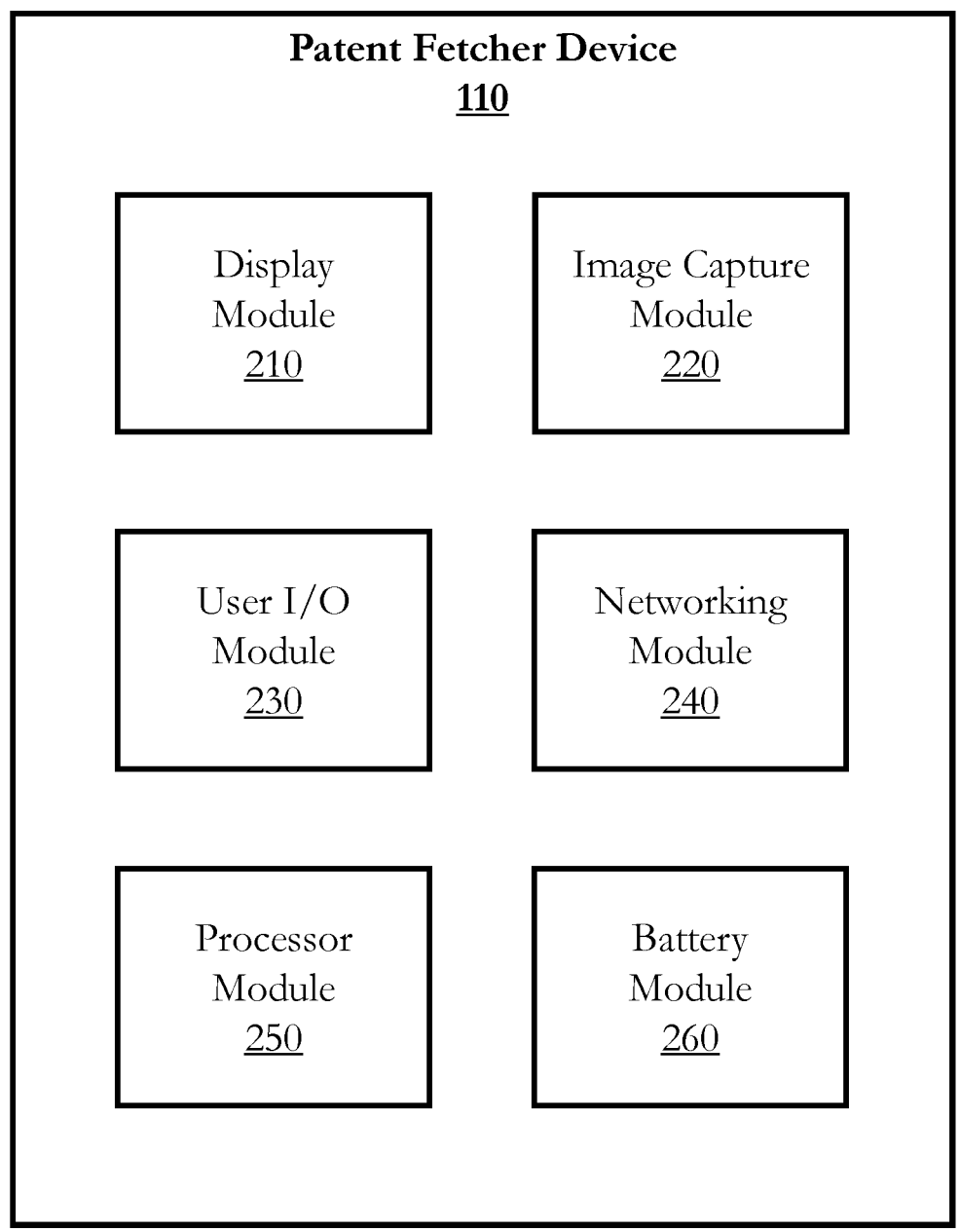
FIG. 2 depicts a block diagram of a patent fetcher device according to embodiments of the present disclosure.

FIG. 2 depicts a block diagram of the patent fetcher device 110 according to embodiments of the present disclosure. In some embodiments, the patent fetcher device 110 may contain or otherwise be communicatively coupled with one or more modules such as a display module 210, an image capture module 220, a user input/output (I/O) module 230, a networking module 240, a processor module 250, a battery module 260, and/or other modules (not shown).

The display module 210 may be a screen such as a smartphone or tablet full-color touchscreen, an e-ink display such as an e-reader screen or touchscreen, or another type of display or output device.

The image capture module 220 may be a camera such as a smartphone or tablet camera, a bar code scanner, or another type of image capture or input device. In some embodiments, the display module 210 or a separate display module may be used to show a preview of what the image capture module 220 is presently capturing. In some embodiments, when an object such as a bar code has been recognized, the display module 210 may "freeze" or otherwise show a static image that includes the recognized object. In other embodiments, the display module 210 may indicate that a recognized object is a new patent bar code or a duplicate of patent bar code previously scanned or retrieved. In some embodiments, the display module 210 may display a cue to a user, such as a bar code scan line, to aid a user with positioning the image capture module 220 (and/or the patent fetcher device 110 itself) for capturing an image with a recognizable bar code or other object such as a 2-D data matrix or QR code.

The I/O module 230 may be a touchscreen (i.e., embedded in the display module 210) of a smartphone or tablet, a virtual or physical keypad or other buttons, a bar code scanner "trigger," or another type of input and/or output device. In some embodiments, the I/O module 230 may be a virtual keypad or other interface for a user to input a patent serial number, select a "country code" (e.g., "US" for the United States, "EP" for the EPO, "WO" for WIPO, etc.), select a "kind code" (e.g., "B1" for a US patent without a prior application publication, etc.), and/or select a type of patent (e.g., a utility patent, a design patent, a reissue patent, a plant patent, etc.).

The networking module 240 may be used for transmitting or receiving data over a telecommunications network such as the Internet. For example, the networking module 240 may send queries via API calls to a third-party patent database and receive information or copies of electronic patent documents from the third-party patent database. In some embodiments, the networking module 240 may transmit copies of electronic patent documents to third-party devices, cloud storage, or other devices.

The processor module 250 may be a computer processor or other computing or processing device such as a smartphone or tablet CPU. The processor module 250 may include hardware and/or software for various tasks such as recognizing bar codes in captured images. In some embodiments, the processor module 250 may be communicatively coupled to other processing modules such as integrated circuits, graphics processing units (GPUs), image processing modules, etc. In some embodiments, the processor module 250 may communicate with other processing modules via networking module 240. For example, the patent fetcher device 250 may offload optical character recognition (OCR), image object recognition, or other business logic to a mobile BaaS or other type of server.

In some embodiments, an optional battery module 260 may provide power to a mobile patent fetcher device 110 that is not otherwise tethered or plugged-in to another device or power supply.

Figure 3A:
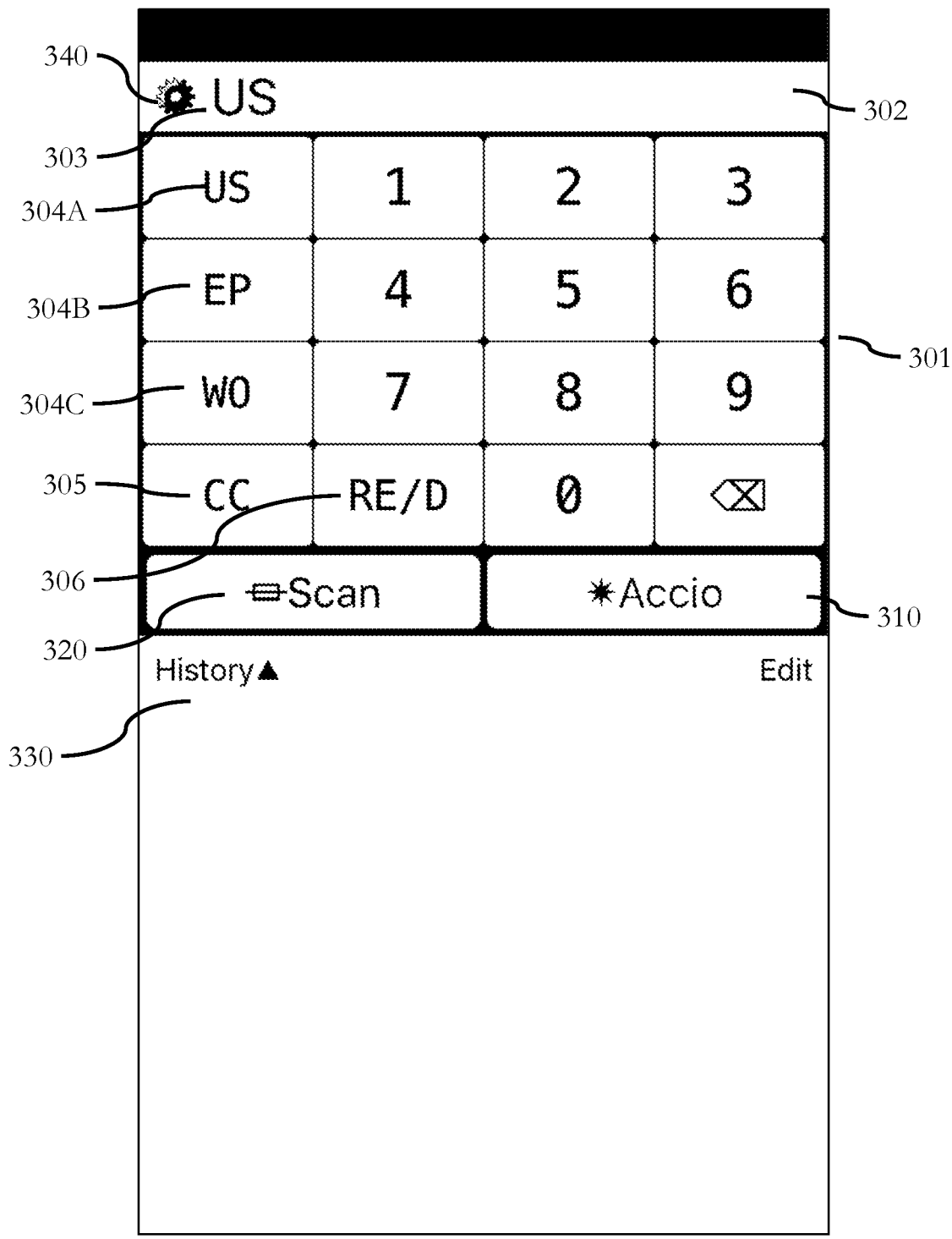
FIG. 3A shows a schematic representation of a patent fetcher device according to embodiments of the present disclosure.

FIG. 3A shows a schematic representation of a patent fetcher device 300A according to embodiments of the present disclosure. In some embodiments, patent fetcher device 300A may be a mode or other portion of a user interface of patent fetcher device 110 (FIGS. 1 and 2). Patent fetcher device 300A may include a keypad 301, a text field 302, and an indicator label 303.

The keypad 301 may contain various buttons such as number buttons. The number buttons may be arranged like a telephone keypad with 1, 2, and 3 in the top row as shown in FIG. 3A, or the number buttons may be arranged in a different manner such as a keyboard number pad with 7, 8, and 9 in the top row (not shown). In some embodiments, the keypad 301 may include one or more country code preset keys (or shortcut keys, hotkeys, etc.) such as country code presets 304A-C. In the example of keypad 301, country code preset 304A is for "US", country code preset 304B is for "EP", and country code preset 304C is for "WO". In some embodiments, the country code presets may be user configurable. For example, if a user frequently retrieves German patents, the user may change country code preset 304A from "US" to "DE" for Germany (Deutschland).

The text field 302 may include user-inputted values and/or status information. For example, the text field 302 may display a sequence of numbers as a user enters them via keypad 301. In some embodiments, the text field 302 may also be used to display various status messages or help messages (e.g., tooltips).

The indicator label 303 may display other user-selected information such as a selected country code or a default country code (e.g., "US" in the example of FIG. 3A). The indicator label may also show other patent information, such as the type of patent ("D" for design patents, "RE" for reissue patents, etc.). In the example of FIG. 3A, the indicator label 303 does not show an explicit patent type identifier, which, in some embodiments, indicates a default patent type (e.g., a utility patent). In some embodiments, there may be another indicator label (not shown) that display kind code information following the user-inputted patent number.

Patent fetcher device 300A may also include a country code selector button such as country code selector button 305 (labeled "CC" in FIG. 3A). As described in more detail below with reference to FIGS. 3B-D, the country code selector button 305 may open a menu or other portion of a user interface to facilitate user-selection of a country code, which may be different from the country codes available via country code preset keys 304A-C.

Patent fetcher device 300A may also include a patent type selector button such as patent type selector button 306 (labeled "RE/D" in FIG. 3A). In some embodiments, the patent type selector may toggle or cycle through various patent types. For example, the default setting may be a utility patent, with no explicit indicator shown in indicator label 303. If the user presses the patent type selector button 306 once, the patent fetcher device 300A may cycle to reissue patents and indicate as such by displaying "US RE" in the indicator label 303. If the user presses the patent type selector button 306 a second time, the patent fetcher device 300A may cycle to design patents and indicate as such by displaying "US D" in the indicator label 303. If the user presses the patent type selector button 306 a third time, the patent fetcher device 300A may cycle back to utility patents and indicate as such by displaying "US" without an explicit patent type indicator in indicator label 303.

In some embodiments, the functionality of patent type selector button 306 is combined with the country code preset for "US" such as country code preset 304A (not shown). In this embodiment, selected the combined "US: RE/D" country code preset button may change the selected country code to "US" if another country code had been selected, or it may cycle through the various patent types if "US" was already selected.

In some embodiments, additional patent types may be available through the patent type selector button 306 or another user interface element, such as plant patents. In some embodiments, if type selection is not explicitly supported for the selected country code, the patent type selector button 306 may be disabled or otherwise deactivated, automatically switching to a supported patent type (e.g., utility patents) for the selected country code.

Patent fetcher device 300A may also include a submit/enter/fetch-type button such as fetch button 310 (labeled "Accio" as shown, which is Latin for "fetch" or "summon"). For example, after a user has selected a country code and/or a patent type and inputted a patent number, the user may press the fetch button 310 to initiate a request to lookup and/or retrieve a copy of a patent from a patent database.

In some embodiments, fetch button 310 may be one of the buttons in keypad 301 (not shown). For example, in the embodiments described above in which the functionality of patent type selector button 306 is combined with the country code preset for "US" such as country code preset 304A, fetch button 310 may occupy one of the slots left open (e.g., one of the sixteen slots in the four-by-four grid of keypad 301).

Patent fetcher device 300A may also include a mode switch button such as mode switch button 320 (labeled "Scan" in FIG. 3A). In the example of FIG. 3A, pressing the mode switch button 320 may cause the patent fetcher device 300A to switch to a different mode, such as a bar code scanning mode, described below with reference to FIGS. 6A-C.

Patent fetcher device 300A may also include a history component, such as history component 330, described below with reference to FIGS. 4A and 4B.

Patent fetcher device 300A may also include a settings button such as settings button 240, which may cause a portion of the user interface to be displayed (not shown) that enables a user to view or change various user settings, log into or out of the system, subscribe or unsubscribe from various premium services, synchronize or erase stored data, view help information, contact the patent fetcher device 300A seller, etc.

Figure 3B:
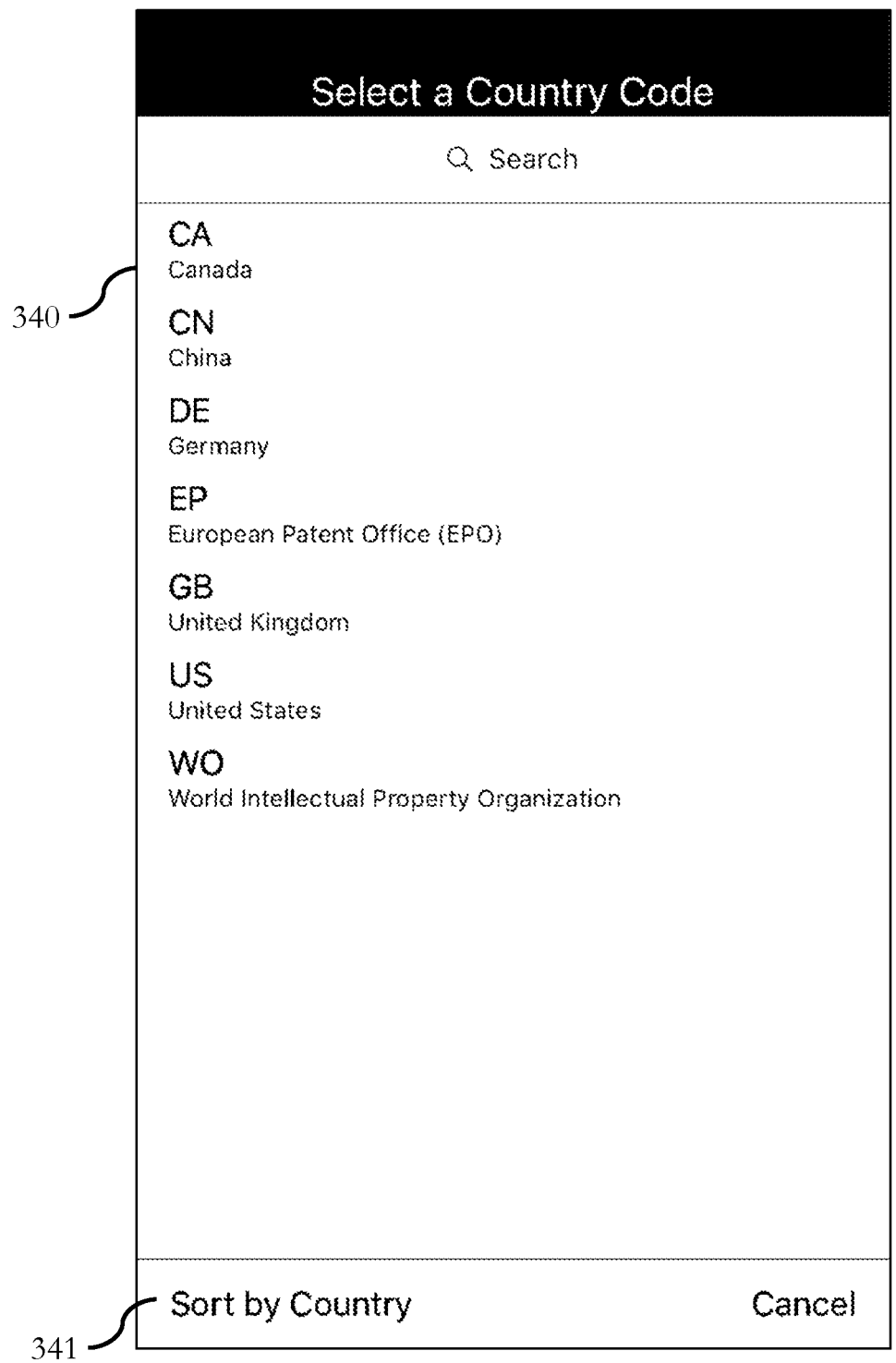
FIG. 3B shows a schematic representation of a patent fetcher device according to embodiments of the present disclosure.
Figure 3C:
FIG. 3C shows a schematic representation of a patent fetcher device according to embodiments of the present disclosure.
Figure 3D:
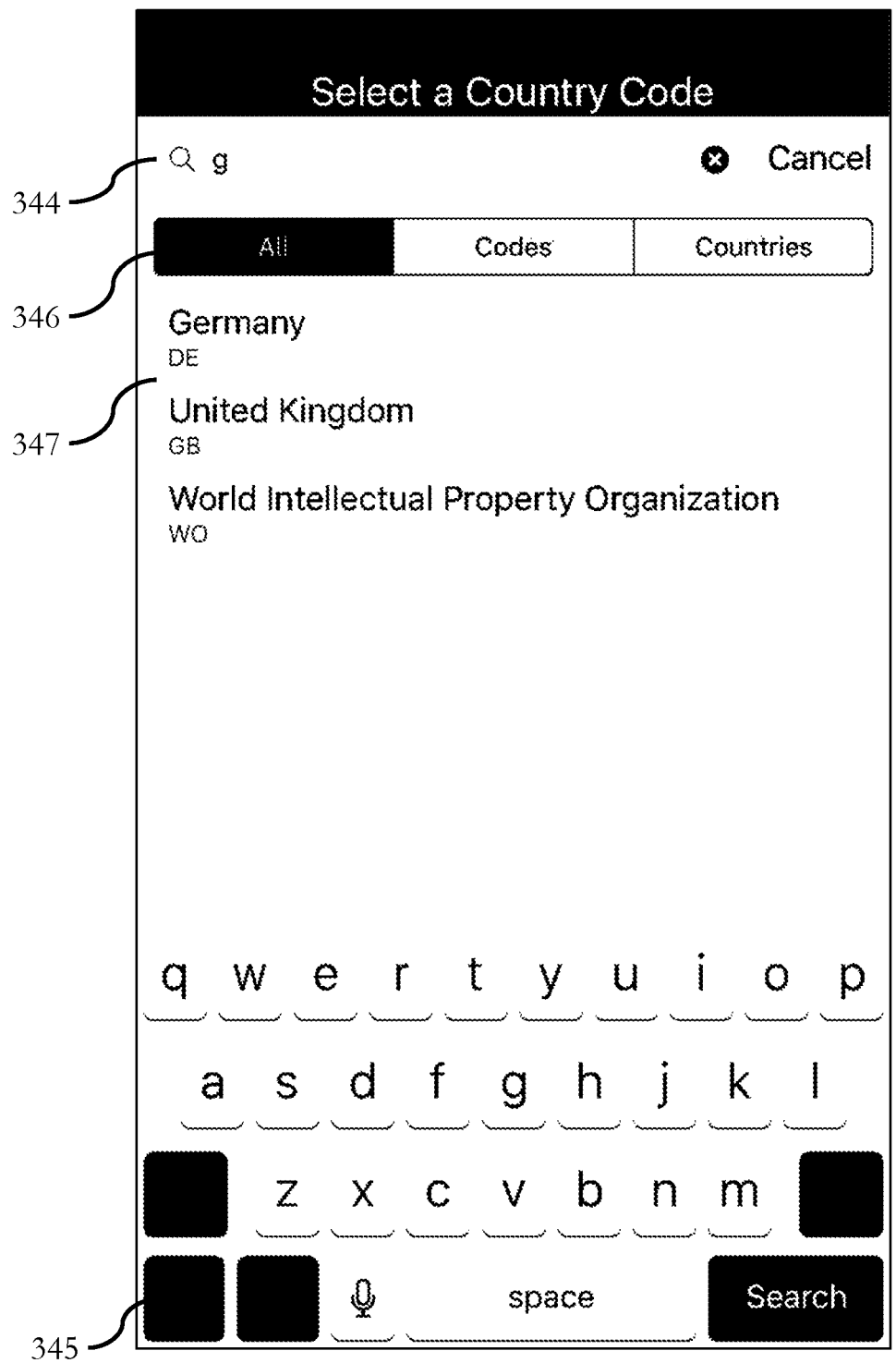
FIG. 3D shows a schematic representation of a patent fetcher device according to embodiments of the present disclosure.

As noted above, a user interface for selecting a country code may be displayed, such as when a user presses country code selector button 305. FIGS. 3B-3D show schematic representations of patent fetcher devices 300B-300D, respectively, according to embodiments of the present disclosure. In some embodiments, patent fetcher devices 300B-300D may be a mode or other portion of a user interface of patent fetcher device 110 (FIGS. 1 and 2). In the example of FIGS. 3B-3D, each screen shows a different variation of a country code selection user interface.

Patent fetcher device 300B shows a list of country codes sorted by code. In some embodiments, only country codes explicitly supported by patent fetcher device 300B may be shown. In this simplified example, seven country codes are shown, including "country codes" for regional or international organizations such as "EP" for the EPO and "WO" for WIPO. In other embodiments, more country codes may be shown. In some embodiments, patent fetcher device ix) 300B may show one or more country codes from the WIPO ST.3 Table—containing a WIPO-standardized list of states, other entities, and intergovernmental organizations. The WIPO ST.3 Table is hereby incorporated by reference herein. A copy of the 2016 revision of WIPO ST.3 is available at http://www.wipo.int/export/sites/www/standards/en/pdf/03-03-01.pdf.

Patent fetcher device 300B may also include a sort button such as country sort button 341 (labeled "Sort by Country" in FIG. 3B). Pressing country sort button 342 may update the user interface to display a list of country codes sorted by the name of each country (or organization) as described below with reference to FIG. 3C.

Patent fetcher device 300C shows a list of country codes sorted by country. In some embodiments, as with patent fetcher device 300B (FIG. 3B), only country codes explicitly supported by patent fetcher device 300C may be shown. In this simplified example, seven country codes are shown. In other embodiments, more country codes may be shown. In some embodiments, patent fetcher device 300C may show one or more country codes from the WIPO ST.3 Table.

Patent fetcher device 300C may also include a sort button such as code sort button 343 (labeled "Sort by Code" in FIG. 3C). Pressing code sort button 343 may update the user interface to display a list of country codes sorted by code as described above with reference to FIG. 3B.

The country code selector user interface may also include search functionality. FIG. 3D shows a schematic representation of a patent fetcher device 300D according to embodiments of the present disclosure. In some embodiments, patent fetcher device 300D may be a mode or other portion of a user interface of patent fetcher device 110 (FIGS. 1 and 2). In some embodiments, the search functionality may include a search bar 344, search keyboard 345, search mode toolbar 346, and search results list 347.

In some embodiments, tapping search bar 344 or otherwise activating the search functionality may enable a user to enter a search query using search keyboard 345. The search bar 344 may display the query as it is typed, as well as other user interface elements or affordances such as a clear button and a cancel button.

In some embodiments, the search results list 347 may update as each character is entered into search bar 344. In other embodiments, the search results list 347 may wait until a user presses the "Search" button or a similar button on the search keyboard 345.

In some embodiments, the user may select a search mode using search mode toolbar 346. In the example of FIG. 3D, there are three modes: "All," "Codes," and "Countries." When "All" is selected (as shown), country codes appear in the search results list if the query is found in either the country code or the name of the country/organization. In the example of FIG. 3D, the search query is "g", and the search results list 347 shows Germany (DE), United Kingdom (GB), and the World Intellectual Property Organization (WO). If the user selects "Codes," Germany would no longer appear in the search results list 347 because Germany's code "DE" does not contain the query "g". WIPO would also no longer appear in the search results list 347. If the user selects "Countries," all three would remain in the search results list 347 because all three results include the query "g" in the country/organization name.

In some embodiments, the search results list 347 may indicate the portion of the search result containing the search query (e.g., bolding or underlining the letter "g" or "G" in each of the results for the example above).

Figure 3E:
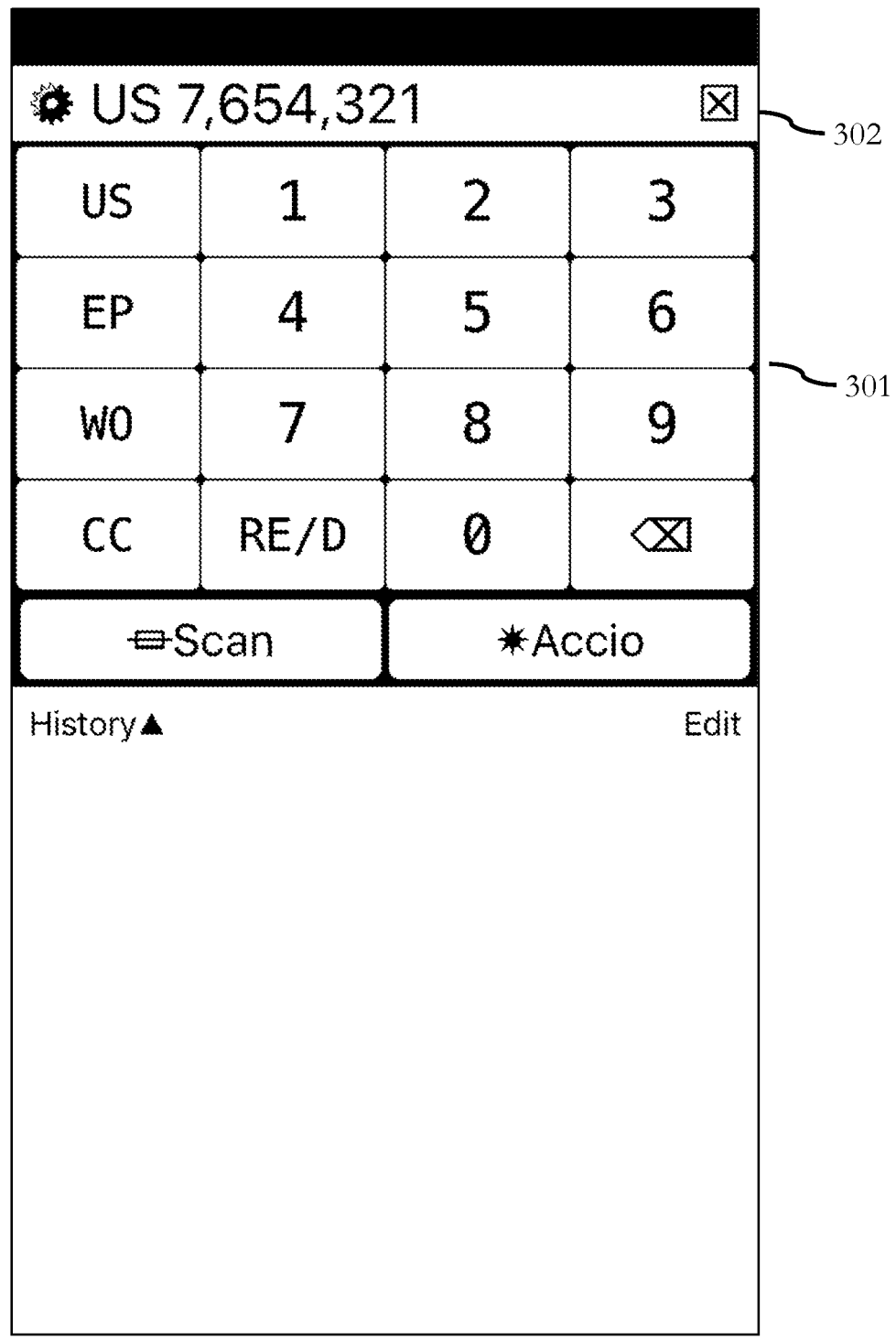
FIG. 3E shows a schematic representation of a patent fetcher device according to embodiments of the present disclosure.

FIG. 3E shows a schematic representation of a patent fetcher device 300E according to embodiments of the present disclosure. In some embodiments, patent fetcher device 300E may be a mode or other portion of a user interface of patent fetcher device 110 (FIGS. 1 and 2). In this example, patent fetcher device 300E has received user input via the keypad 301. For example, the user may have typed "7654321" using the keypad 301.

In some embodiments, patent fetcher device 300E may automatically format the user input shown in text field 302. In the example of FIG. 3E, patent fetcher device 300E recognized that the user has entered a 7-digit US patent number, which may typically be displayed with commas as "7,654,321". For another example (not shown), patent fetcher device 300E may recognize that a user has entered an 11-digit US application publication number such as "20111234567", which may typically be displayed with a forward slash separating the four-digit year from the seven-digit serial number as "2011/1234567". For another example (not shown), patent fetcher device 300E may recognize that a user has selected patent type US Reissue and entered a 5-digit reissue patent number such as "54321", which may typically be displayed as "US RE54,321." Other examples for other combinations of country codes, patent types, patent/serial numbers, and kind codes may be similarly recognized and/or formatted. For example, an 8-digit US patent number may typically be displayed with commas as "10,000,000".

In some embodiments, patent fetcher device 300E may automatically detect an invalid entry. For example, if a user enters a 13-digit number for a US patent, and the USPTO has not yet issued any patents or publications with 13 digits, patent fetcher device 300E may indicate a warning that the user may have entered an invalid number. For example, patent fetcher device 300E may display the input in a different color such as red. In some embodiments, patent fetcher device 300E may disable or otherwise deactivate the fetch button 310 (in FIG. 3E, the button labeled "Accio"). In other embodiments, patent fetcher device 300E may allow the user to proceed with attempting a fetch action, with or without additional warnings. If a fetch action is unsuccessful, patent fetcher device 300E may display an error message or other type of informational error message to inform the user that the fetch was unsuccessful.

Figure 4A:
FIG. 4A shows a schematic representation of a patent fetcher device according to embodiments of the present disclosure.

FIG. 4A shows a schematic representation of a patent fetcher device 400A according to embodiments of the present disclosure. In some embodiments, patent fetcher device 400A may be a mode or other portion of a user interface of patent fetcher device 110 (FIGS. 1 and 2).

History component 330 may include a list of recently requested patents and/or information about each recently requested patent. History component 330 may be user-interactive. For example, a user may be able to scroll through the list, sort or delete items from the list, select items in the list to view more information about the selected patent, or initiate further requests about the item (e.g., downloading a PDF copy of the listed patent). In the example of FIG. 4A, each item in history component 330 shows a patent number (including country code, formatted patent number, and kind code). Each item also shows the name of the first inventor and the original assignee.

In some embodiments, an "Edit" button may enable a user to select multiple items for deletion or other actions. In some embodiments, a download button for each item may enable a user to download a copy (e.g., a PDF copy) of the electronic patent document having the patent number shown in the history component 330.

In some embodiments, a user interface element (such as an "up triangle" button) may enable a user to expand the history component 330 to show more items in the list on the screen without requiring as much scrolling. The history component 330 shown in FIG. 4A is merely an example; many other configurations, interactive elements, user interface design, and informational indicators may be provided. For example, in some embodiments, history component 330 may have sort and search functionality, "View PDF" buttons, etc.

Figure 4B:
FIG. 4B shows a schematic representation of a patent fetcher device according to embodiments of the present disclosure.

FIG. 4B shows a schematic representation of a patent fetcher device 400B according to embodiments of the present disclosure. In some embodiments, patent fetcher device 400B may be a mode or other portion of a user interface of patent fetcher device 110 (FIGS. 1 and 2). In FIG. 4B, history component 330 has been expanded to take up most of the screen (e.g., by "collapsing" or otherwise hiding or removing the keypad 301 (FIG. 3A)). In some embodiments, a user interface element (such as a "down triangle" button) may enable a user to restore the history component 330 to its default size. In some embodiments, the history component 330 may be collapsed or otherwise hidden so that no history items are shown.

In some embodiments, a patent fetcher device such as patent fetcher device 110 may have additional features such as saving and restoring state after quitting or restarting the patent fetcher device 110, synchronizing state or other data to other patent fetcher devices, etc.

As described briefly above, a patent fetcher device may also have bar code scanning capabilities. For example, if a user has a paper copy of a patent document or the first page of a patent document containing a bar code or other type of machine-readable encoded information, the patent fetcher device may be capable of scanning the patent document, recognizing the bar code, and decoding the bar code.

Figure 5A:
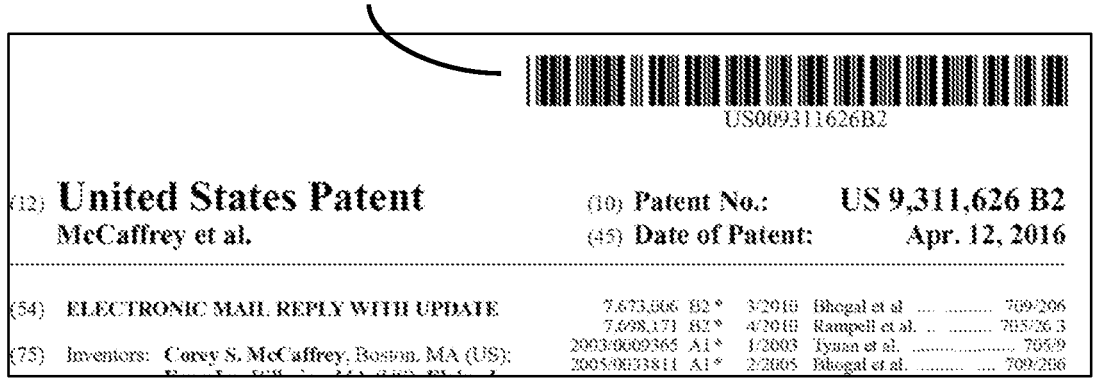
FIG. 5A depicts a portion of a patent document according to embodiments of the present disclosure.
Figure 5B:
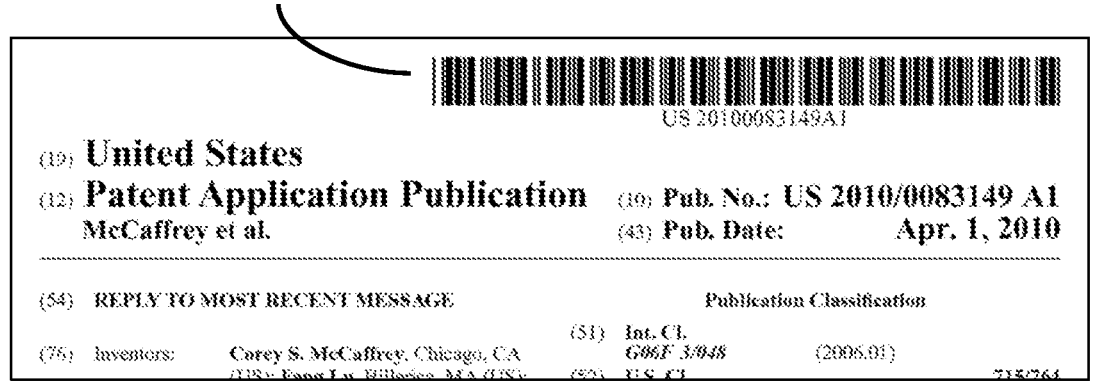
FIG. 5B depicts a portion of a patent document according to embodiments of the present disclosure.
Figure 5C:
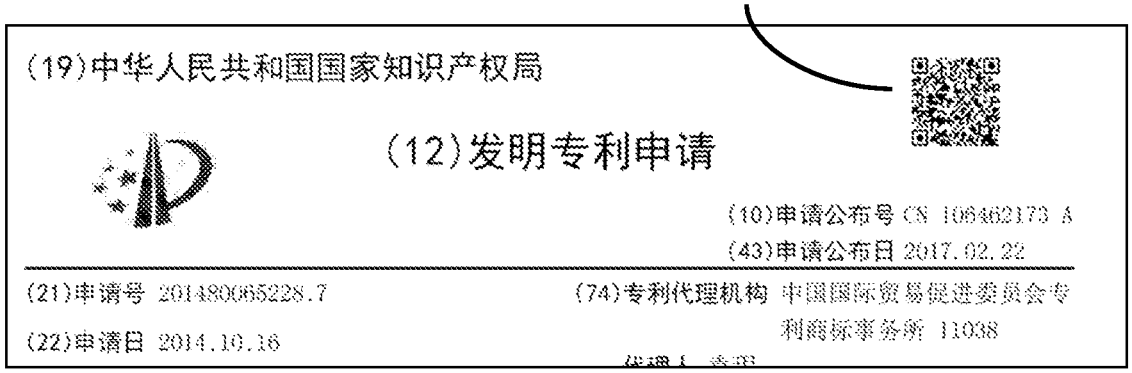
FIG. 5C depicts a portion of a patent document according to embodiments of the present disclosure.

FIGS. 5A-C depict portions of patent documents 510A-C, respectively, according to embodiments of the present disclosure, showing examples of patent documents having bar codes or other types of machine-readable encoded information.

Patent document 510A in FIG. 5A is a US patent (U.S. Pat. No. 9,311,626 B2) and includes a bar code encoded with the string "US009311626B2".

Patent document 510B in FIG. 5B is a US patent application publication (US Patent Application Publication No. 2010/0083149 A1) and includes a bar code encoded with the string "US 20100083149A1".

Patent document 510C in FIG. 5C is a Chinese patent application publication (CN Patent Application Publication No. 106462173 A) and includes a 2-D data matrix or QR code encoded with a string containing a SIPO URL that includes the serial number.

Figure 6A:
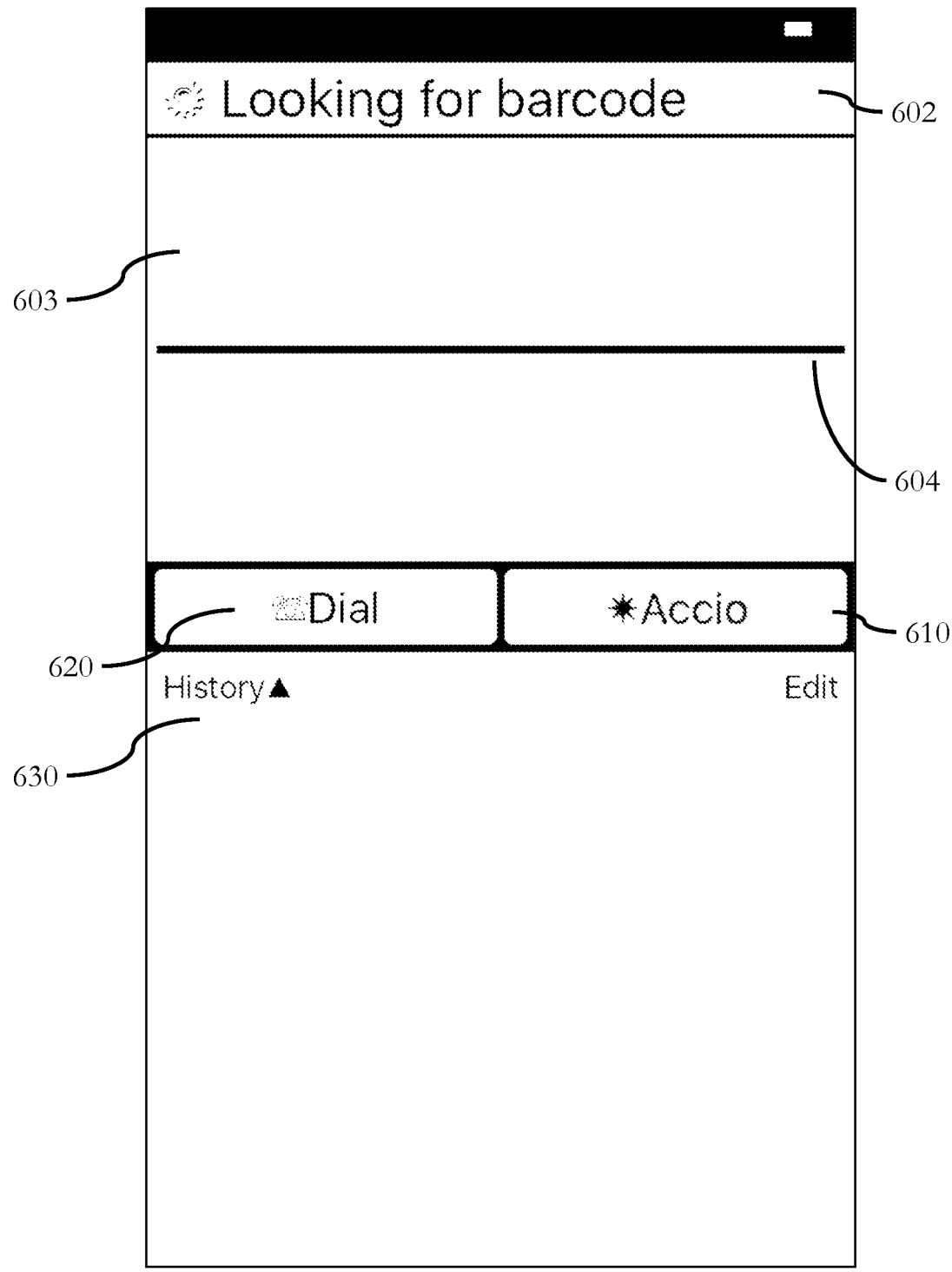
FIG. 6A shows a schematic representation of a patent fetcher device according to embodiments of the present disclosure.

FIG. 6A shows a schematic representation of a patent fetcher device 600A according to embodiments of the present disclosure. In some embodiments, patent fetcher device 600A may be a mode or other portion of a user interface of patent fetcher device 110 (FIGS. 1 and 2). In some embodiments, a status field 602 shows a message such as "Looking for barcode" or other information.

In some embodiments, the user interface shown in FIG. 6A may be enabled using the mode switch button 320 (labeled "Scan" in FIG. 3A). For example, a camera preview window 603 and/or bar code scan line 604 may to replace or cover (e.g., using animation) all or part of keypad 301 (FIG. 3A).

In some embodiments, patent fetcher device 600A may include a mode switch button such as mode switch button 620 (labeled "Dial" in FIG. 6A), which may be the same button as mode switch button 320 in FIG. 3A with a modified label and behavior. In the example of FIG. 6A, pressing the mode switch button 620 may cause patent fetcher device 600A to switch to a different mode, such as a dialer/keypad entry mode, described above with reference to FIGS. 3A-3E.

In some embodiments, camera preview window 603 may display a live image (e.g., live video or live preview) of the information captured by an image capture module such as image capture module 220 (FIG. 2). In some embodiments, the camera preview window 603 may display a static image showing a recognized object such as a bar code as described above with reference to FIG. 2. The bar code scan line 604 may aid a user with positioning the image capture module for capturing an image with a recognizable bar code or other object as described above with reference to FIG. 2.

In some embodiments, patent fetcher device 600A may also include a submit/enter/fetch-type button such as fetch button 610 (labeled "Accio" in FIG. 6A), which may be the same as fetch button 310 (FIG. 3A). For example, after a user has scanned a bar code encoding a patent number, the user may press the fetch button 610 to initiate a request to lookup and/or retrieve a copy of a patent from a patent database. In other embodiments, patent fetcher device 600A may scan for bar codes continuously, automatically retrieving new bar codes (i.e., without requiring the user to press a button such as fetch button 310) or identifying duplicate or previously scanned bar codes.

Patent fetcher device 600A may also include a history component, such as history component 630, which may the same as history component 330, described above with reference to FIGS. 4A and 4B. In some embodiments, history component 630 may indicate only patent items fetched using the bar code scanner, or in a list of all items, it may indicate or otherwise allow filtering of items retrieved using the bar code scanner, the keypad dialer, or other methods (e.g., voice search).

Figure 6B:
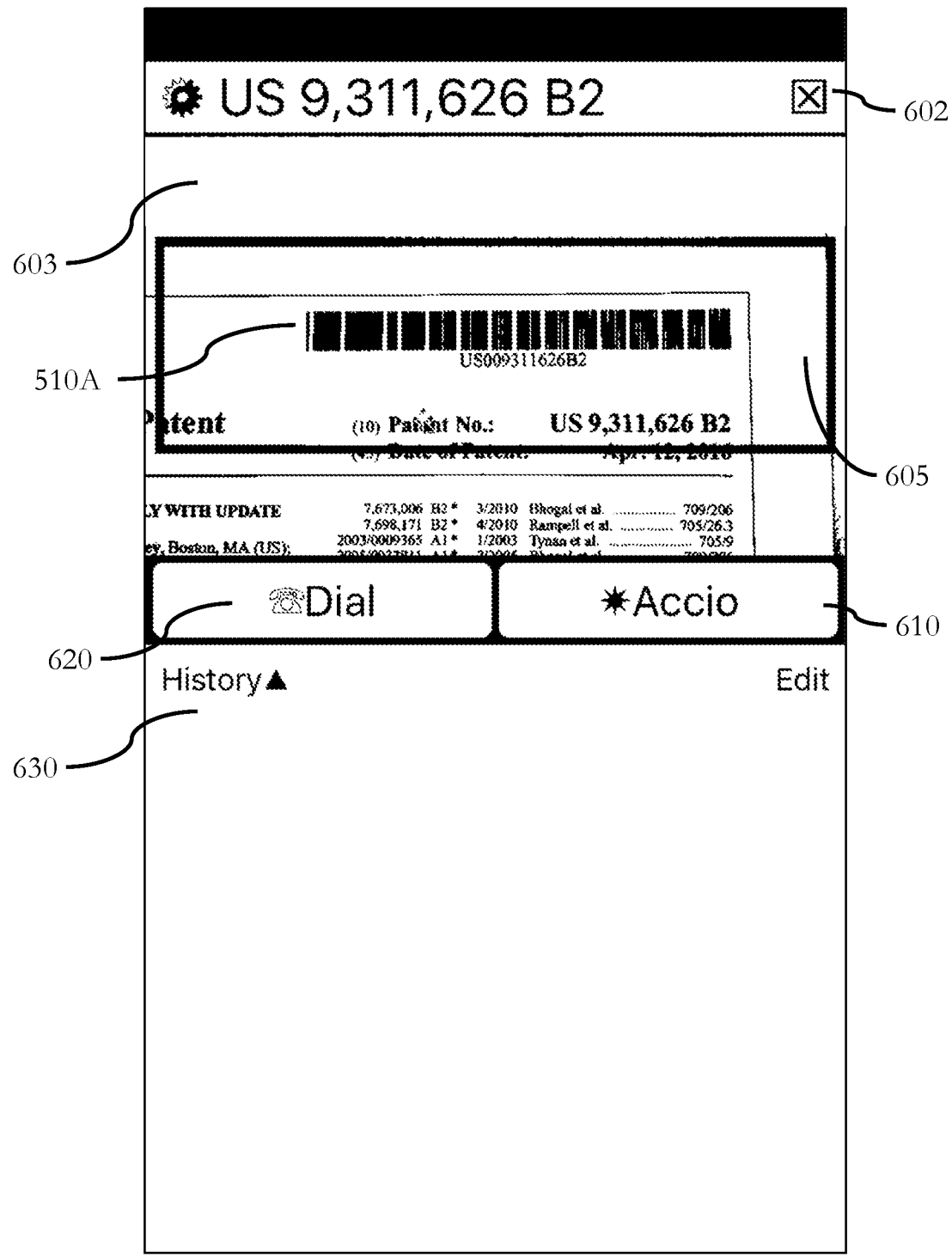
FIG. 6B shows a schematic representation of a patent fetcher device according to embodiments of the present disclosure.

FIG. 6B shows a schematic representation of a patent fetcher device 600B according to embodiments of the present disclosure. In some embodiments, patent fetcher device 600B may be a mode or other portion of a user interface of patent fetcher device 110 (FIGS. 1 and 2). In some embodiments, when patent fetcher device recognizes a bar code, the user interface may be updated as shown in the example of FIG. 6B. In the example of FIG. 6B, patent fetcher device 600B recognized a bar code from document 510A (FIG. 5A) encoded with the string "US009311626B2".

In some embodiments, status field 602 may be updated to show the recognized bar code, which may be formatted according to typical formatting. In the example of FIG. 6B, status field 602 shows the decoded and converted/formatted string "U.S. Pat. No. 9,311,626 B2". A user interface element may also appear, such as the "X in a box" button on the right side of (or to the right of) status field 602, which, if pressed, may clear the recognized bar code and resume live scanning.

In some embodiments, the camera preview window 603 may highlight the recognized object in some visual manner.

For example, the camera preview window 603 may draw a rectangle 605 around a region containing the bar code. In some embodiments, animation may be used to "morph" or otherwise transition the bar code scan line 604 into the rectangle 605 or other shape and vice versa when live scanning is resumed.

In some embodiments, patent fetcher device 600B may give the user other indications that a bar code has been recognized, such as causing itself to vibrate using a haptic feedback module (not shown), or emitting a sound from a speaker module (not shown).

In some embodiments, patent fetcher device 600B may automatically search for and/or fetch information or a copy of the patent identified in the recognized bar code. In such embodiments, patent fetcher device 600B may scan for bar codes continuously, automatically retrieving new bar codes (i.e., without requiring the user to press a button such as fetch button 310) or identifying duplicate or previously scanned bar codes. In other embodiments, the patent fetcher device 600B may freeze the camera preview window 603 and wait for a user to press the fetch button 610 to initiate search/fetch/retrieval.

After initiating a fetch, live scanning may resume, searching for a second bar code, and the previously scanned item may appear in history component 330.

Figure 6C:
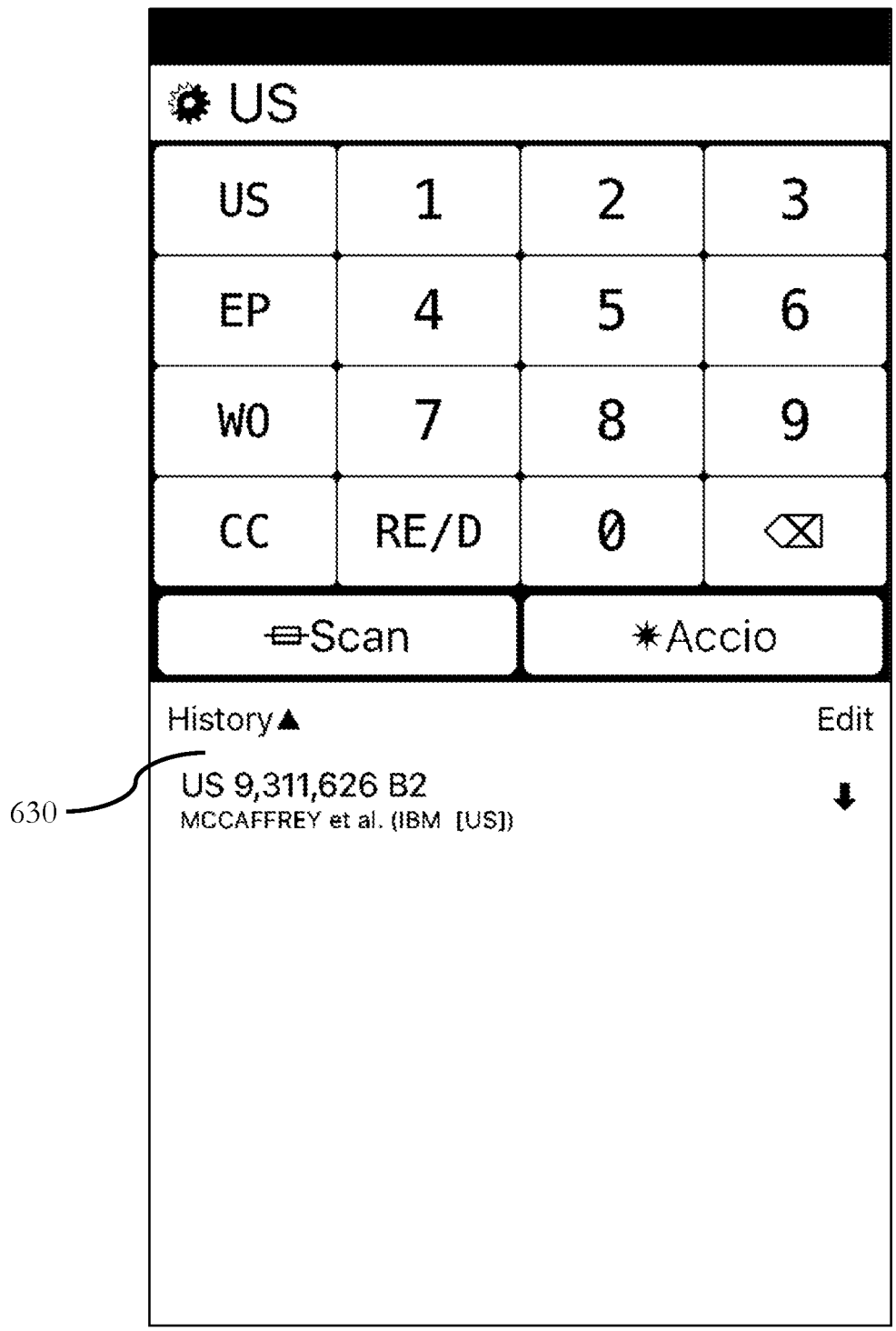
FIG. 6C shows a schematic representation of a patent fetcher device according to embodiments of the present disclosure.

FIG. 6C shows a schematic representation of a patent fetcher device 600C according to embodiments of the present disclosure. In some embodiments, patent fetcher device 600C may be a mode or other portion of a user interface of patent fetcher device 110 (FIGS. 1 and 2). In the example of FIG. 6C, the user successfully fetched U.S. Pat. No. 9,311,626, which may appear in the history component 630. The user may have also pressed the mode switch button 620 (FIG. 6B) to switch the interface back to dialer/keypad mode.

FIG. 7 shows a schematic representation of a patent fetcher device 600C according to embodiments of the present disclosure. In some embodiments, patent fetcher device 600C may be a mode or other portion of a user interface of patent fetcher device 110 (FIGS. 1 and 2). In the example of FIG. 7, the user may have tapped on or otherwise selected an item from history component 630 (FIG. 6C) for U.S. Pat. No. 9,311,626.

In some embodiments, a patent information interface 710 may appear, showing additional metadata or other information about the selected patent. In the example of FIG. 7, patent information interface 710 shows the patent number, inventors, original assignee, priority date (e.g., earliest priority date) or dates, filing date, publication date (e.g., date of application publication, date of grant, etc.), and abstract. In some embodiments, additional patent information may be displayed such as the patent description, claims, drawings, etc.

In some embodiments, one or more buttons or other user interface elements may enable a user to download, view, save, export, share, delete, and/or otherwise interact with an original copy of an electronic patent document such as a Portable Document Format ("PDF") file. In some embodiments, a "Done" button or other user interface element may enable a user to return to a user interface showing a history component such as history component 330 or history component 630. In some embodiments, "Previous" and "Next" buttons (not shown) or other user interface elements may enable a user to display information about other patents from the history component 630 in the patent information interface 710. In some embodiments, a "Delete" button (not shown) or other user interface element may enable a user to delete or otherwise remove the patent from the history component 630. In some embodiments, an "Edit" button or other user interface element may enable a user to select, edit, reorder, or delete individual items, or clear/delete all items, in the history component 630.

Figure 8A:
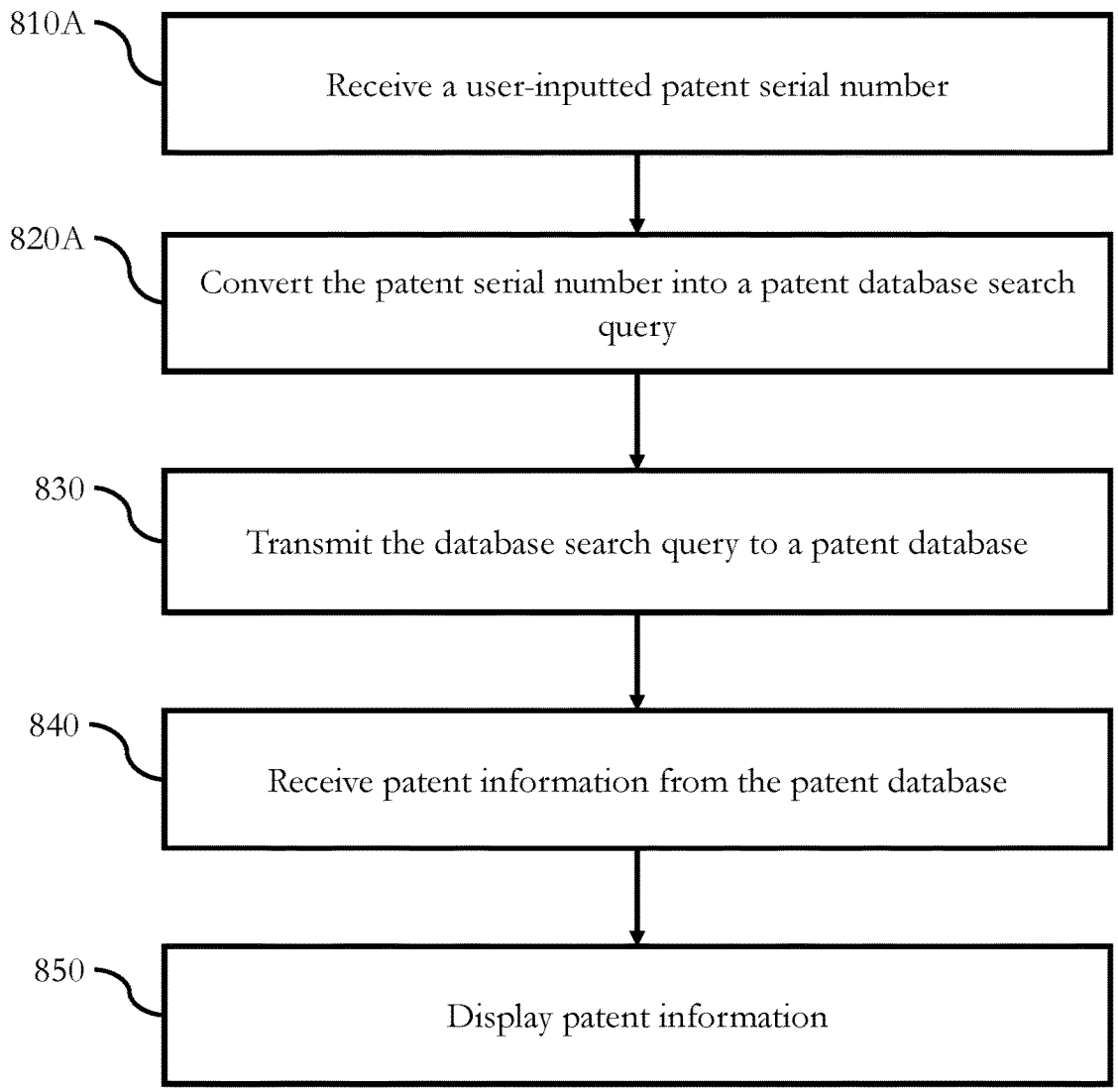
FIG. 8A depicts a flow diagram of a patent fetcher method according to embodiments of the present disclosure.

FIG. 8A depicts a flow diagram of a patent fetcher method 800A according to embodiments of the present disclosure. At block 810A, patent fetcher method 800A may begin.

At block 810A, a user-inputted patent serial number may be inputted. For example, a user may use a keypad dialer or other input mechanism to input the patent serial number for a patent fetcher device to receive. In some embodiments, the user-inputted patent serial number may be validated, formatted, transcoded, or otherwise manipulated for display to the user. The displayed patent serial number may convey additional information to a user, such as whether the patent fetcher device considers the patent serial number to be valid. After receiving the user-inputted patent serial number, patent fetcher method 800A may proceed to block 820A.

At block 820A, the patent serial number may be converted or otherwise used to generate a search query or an API call for patent database. For example, a government-provided database may provide an API that requires the patent serial number to be in a particular format, such as removing or inserting extra zeroes in particular positions within the search query or string. After converting the patent serial number into a patent database search query, patent fetcher method 800A may proceed to block 830.

At block 830, the database search query may be transmitted to a patent database. The database search query or API call may be constructed in a particular way such that the patent database may return particular information about the patent being queried, a copy (e.g., PDF copy) of the patent itself, etc. After the database search query has been transmitted to the patent database, the patent fetcher method 800A may proceed to block 840.

At block 840, patent information, a copy of the patent itself, etc. may be received from the patent database. For example, a patent fetcher device such as patent fetcher device 110 may listen for a network communication responsive to the request transmitted at block 830. In some embodiments, a single query may be ambiguous. For example, if a query is transmitted with a country code and serial number but no kind code, the patent database may return multiple matching documents. If the patent database returns multiple matching documents, the patent fetcher device may, in various embodiments, offer the user a choice of documents, provide all matching documents, select one of the documents (e.g., the most recently published matching document), etc. After receiving patent information from the patent database, patent fetcher method 800A may proceed to block 850.

At block 850, in some embodiments, patent information may optionally be displayed. For example, patent information may be displayed in a history list, a patent information user interface, a PDF/image viewer, etc. In some embodiments, the patent information may first be transmitted for storage in a different server and made available for viewing later on the patent fetcher device or another device. After optionally displaying the patent information, patent fetcher method 800A may end. In some embodiments, patent fetcher method 800A may return to block 810A to receive additional user input. In other embodiments, multiple instances of patent fetcher method 800A may be performed simultaneously. For example, a patent fetcher device may be receiving patent information from the patent database about one or more patents while simultaneously transmitting one or more additional search queries to the database and/or receiving one or more additional user-inputted patent serial numbers.

Figure 8B:
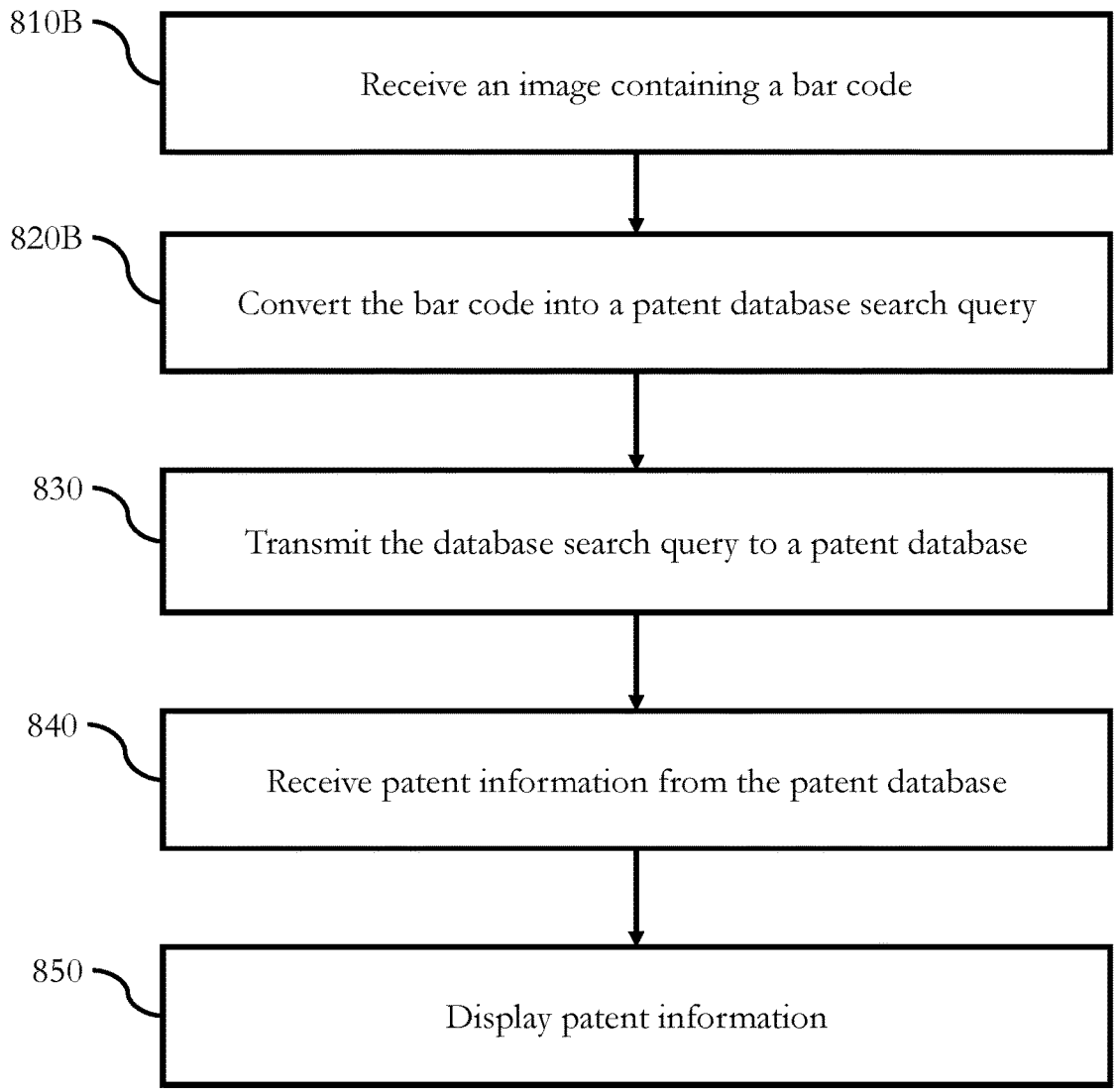
FIG. 8B depicts a flow diagram of a patent fetcher method according to embodiments of the present disclosure.

FIG. 8B depicts a flow diagram of a patent fetcher method 800B according to embodiments of the present disclosure. At block 810B, patent fetcher method 800B may begin.

At block 810B, an image containing a bar code may be received. For example, a camera or other image capture module on a patent fetcher device may receive the image. After receiving the image, patent fetcher method 800B may proceed to block 820B.

At block 820B, the bar code may be converted into a patent database search query. In some embodiments, the patent fetcher device may automatically recognize the bar code and decode a patent serial number or other information from the bar code. Once decoded, the database search query may be generated in a similar manner as in block 820A of patent fetcher method 800A (FIG. 8A). After converting the patent serial number from the bar code into a patent database search query, patent fetcher method 800B may proceed to block 830.

Blocks 830-850 are the same or similar as in patent fetcher method 800A (FIG. 8A) and proceed as described above with reference to FIG. 8A. After optionally displaying the patent information at block 850, patent fetcher 800B may end, return to block 810B, and/or be performed simultaneously as with patent fetcher method 800A.

At this point it should be noted that retrieving electronic patent documents in accordance with the present disclosure as described above may involve the processing of input data and the generation of output data to some extent. This input data processing and output data generation may be implemented in hardware or software. For example, specific electronic components may be employed in an expected performance estimation module or similar or related circuitry for implementing the functions associated with retrieving electronic patent documents in accordance with the present disclosure as described above. Alternatively, one or more processors operating in accordance with instructions may implement the functions associated with retrieving electronic patent documents in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method comprising:
receiving, by at least one computer processor communicatively coupled to a mobile device, from an image capture device of the mobile device, an image containing an encoding of a patent number, wherein the encoding is a bar code or a QR code;
decoding, by the at least one computer processor, the encoding into a first string of a first format containing the patent number, wherein the first format is incompatible with a search function of a patent database;
converting, by the at least one computer processor, the first string containing the patent number into a second string of a second format containing the patent number, wherein the second format is compatible with the search function of the patent database;
transmitting, by the at least one computer processor, the second string of the second format containing the patent number to the search function of the patent database; and
receiving, by the at least one computer processor, patent information based on the patent number.

2. The method of claim 1, wherein the patent number is a patent application publication number.

3. The method of claim 1, wherein the patent number includes a country code.

4. The method of claim 1, wherein the patent number includes a kind code.

5. The method of claim 1, wherein the QR code includes an encoding of a URL associated with the patent number.

6. The method of claim 1, wherein the patent information includes an electronic copy of a patent associated with the patent number.

7. The method of claim 1, further comprising:
converting, by the at least one computer processor, the first string or the second string into a third string of a human-readable format containing a country code, the patent number, and a kind code; and
displaying, by the at least one computer processor, on a graphical user interface of the mobile device, the third string.

8. The method of claim 1, further comprising:
displaying, by the at least one computer processor, on a graphical user interface of the mobile device, a mode switch; and
switching, by the at least one computer processor, between an image scanning mode and a keypad entry mode upon activation of the mode switch.

9. A method comprising:
displaying, by at least one computer processor communicatively coupled to a mobile device, on a touch-enabled graphical user interface of the mobile device, a keypad, wherein the keypad is configured with at least a plurality of number buttons and a country code button;
receiving, by the at least one computer processor, a user-inputted patent number, wherein the user-inputted patent number was inputted using the keypad;
displaying, by the at least one computer processor, on the touch-enabled graphical user interface, the user-inputted patent number and a visual indicator of a default country code or a user-selected country code selected using the country code button;
converting, by the at least one computer processor, the user-inputted patent number into a string containing the patent number and the default country code or the user-selected country code, wherein a format of the string is compatible with a search function of a patent database;

transmitting, by the at least one computer processor, the string containing the patent number and the default country code or the user-selected country code to the search function of the patent database; and receiving, by the at least one computer processor, patent information associated with the patent number from the patent database.

10. The method of claim 9, wherein the string further includes one of: an empty kind code parameter, a default kind code parameter, or a user-inputted kind code parameter.

11. The method of claim 9, wherein the user-inputted patent number includes a user-selected patent type, wherein the user-selected patent type is one of: a utility patent, a reissue patent, or a design patent.

12. The method of claim 9, wherein the plurality of number buttons on the keypad are arranged with a "1" number button, a "2" number button, and a "3" number button in a top row of the plurality of number buttons.

13. The method of claim 9, further comprising:

detecting, by the at least one computer processor, that the user-inputted patent number is an invalid patent number based on at least one of: a length of the invalid patent number, a country code of the invalid patent number, and a patent type of the invalid patent number; and displaying, by the at least one computer processor, on the touch-enabled graphical user interface, a second visual indicator indicating that the invalid patent number is invalid.

14. A system comprising:

at least one computer processor communicatively coupled to a mobile device, wherein the at least one computer processor is further configured to:

receive, from an image capture device of the mobile device, an image containing an encoding of a patent number, wherein the encoding is a bar code or a QR code;

decode the encoding into a first string of a first format containing the patent number, wherein the first format is incompatible with a search function of a patent database;

convert the first string containing the patent number into a second string of a second format containing the patent number, wherein the second format is compatible with the search function of the patent database;

transmit the second string of the second format containing the patent number to the search function of the patent database; and receive patent information based on the patent number.

15. The system of claim 14, wherein the patent number is a patent application publication number.

16. The system of claim 14, wherein the patent number includes a country code.

17. The system of claim 14, wherein the QR code includes an encoding of a URL associated with the patent number.

18. The system of claim 14, wherein the patent information includes an electronic copy of a patent associated with the patent number.

19. The system of claim 14, wherein the at least one processor is further configured to:

convert the first string or the second string into a third string of a human-readable format containing a country code, the patent number, and a kind code; and display, on a graphical user interface of the mobile device, the third string.

20. The system of claim 14, wherein the at least one processor is further configured to:

display, on a graphical user interface of the mobile device, a mode switch; and switch between an image scanning mode and a keypad entry mode upon activation of the mode switch.

* * * * *